UNITED STATES PATENT OFFICE 2,202,664

PLANT PROPAGATING POT

Martin Leatherman, Hyattsville, Md., dedicated to the free use of the People in the territory of the United States No Drawing. Application March 3, 1939,
Serial No. 259,592

5 Claims. (Cl. 47—37)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to plant propagating pots, and is an improvement over my Patent No. 2,129,190, covering a paper propagating pot.

It is well known that raw cellulose, when incorporated into soil, is utilized by cellulose-consuming organisms at a rate which is largely determined by the amount of available nitrogen in the surrounding soil. If sufficient cellulose is added to soil, the nitrogen supply may be so completely depleted that higher plants are inhibited in their growth. This state of affairs exists to a greater or lesser degree when plants are grown in soil-filled cellulose containers.

A paper pot, while it may be quite similar to the woven fiber pot in its chemical composition, possesses certain inherent disadvantages which the present invention avoids. Paper is composed of felted fibers which have been compacted by pressure. Moisture cannot pass through such a felted layer until the whole mass has become saturated. Saturation with water causes the paper to become soft and to lose essentially all of its tensile strength, with the result that the pots cannot be lifted or handled in an intact condition. If pots are plunged in soil for the purpose of conserving the moisture supply this fragility becomes a serious objection.

A propagating pot made of woven fabrics, such as those made from plant and/or animal fibers, or artificial fibers, does not possess these disadvantages because the porous nature of woven material permits free passage of moisture between the interstices without the necessity of preliminary saturation, and even if the fibers become individually saturated, the mechanical structure of woven material is such that no serious lessening of tensile strength occurs as a result of such saturation. Such a pot is desirable for various purposes. For example, such pots may be used as liners for rigid pots to permit the soil contents to be lifted out intact without disturbing the root system of a plant growing therein. Other examples of the usefulness of the woven container are that it can be freely handled without damage to roots, and that it offers less resistance to the passage of rootlets, and can therefore be set intact into the ground with less retardation of the growing plant than occurs in the case of the felted fiber pot.

The woven fiber container may be made of any fiber consisting largely of cellulose, such as cotton, burlap, jute, ramie, etc., but in most cases it will be preferable to employ cotton fibers.

As in the case of felted fibrous containers composed more or less of cellulose, the woven fiber container is easily decomposed by cellulose-consuming organisms abounding in soil. These organisms compete with higher plants for soil nitrogen, and it is necessary that the cellulosic material be so treated that it will be immune to attack. I accomplish this end, as well as additional objectives, by impregnating the material with copper resinate. The copper resinate preserves the material, and in addition it stiffens the fibers and imparts rigidity to the pot. Also the copper resinate exerts a stimulating influence on the growth of plants under favorable conditions.

In my patent above referred to, the desirable effects of copper resinate cannot be fully realized because if too much is impregnated in the paper to make it less subject to deterioration by water, a water proofing effect would result thus depriving the plant in the pot of moisture. In the present invention the woven fabric material can be fully impregnated with copper resinate making the individual threads thereof substantially completely waterproof without depriving the plant of moisture and at the same time preventing deterioration due to moisture and microorganisms.

In practicing my invention I introduce enough copper resinate dissolved in a volatile solvent, to bring the metallic copper content of the treated fabric to a value not exceeding two percent of the total treated weight of the fabric, and then permitting the solvent to volatilize. The mere preservation of the fabric will not require more than one-fifth of this amount, the remainder being added merely for the stiffening effect. I may, therefore, use less copper resinate and substitute rosin as a stiffening agent, since rosin is much cheaper and is soluble in the solvents that are used for dissolving the copper resinate, such as acetone, mineral spirits, and carbon tetrachloride.

It is sometimes desirable to treat the individual threads of the fabric with a copper resinate, either alone or with rosin, before weaving into a fabric to avoid closing the interstices of the fabric. Such closing may occur if the finished fabric is given heavy treatments.

Having thus described my invention, I claim:

1. An article of manufacture comprising a plant propagating pot of woven fabric impregnated with copper resinate and rosin.

2. An article of manufacture comprising a plant propagating pot of woven fabric impregnated with rosin and with 4 to 20% by weight of copper resinate.

3. A plant propagating pot comprising a woven fabric, the individual threads of which have been impregnated prior to weaving with copper resinate and rosin.

4. The method of manufacturing material for plant propagating pots comprising impregnating fibrous threads with copper resinate dissolved in a volatile solvent, volatilizing the solvent, and weaving a fabric from said impregnated threads.

5. The method of manufacturing material for plant propagating pots comprising impregnating fibrous threads with copper resinate and rosin dissolved in a volatile solvent, volatilizing the solvent, and weaving a fabric from said impregnated threads.

MARTIN LEATHERMAN.